April 3, 1945. W. M. PHILLIPS, JR 2,372,737
TORCH FOR WELDING THERMOPLASTIC MATERIAL
Filed April 16, 1943
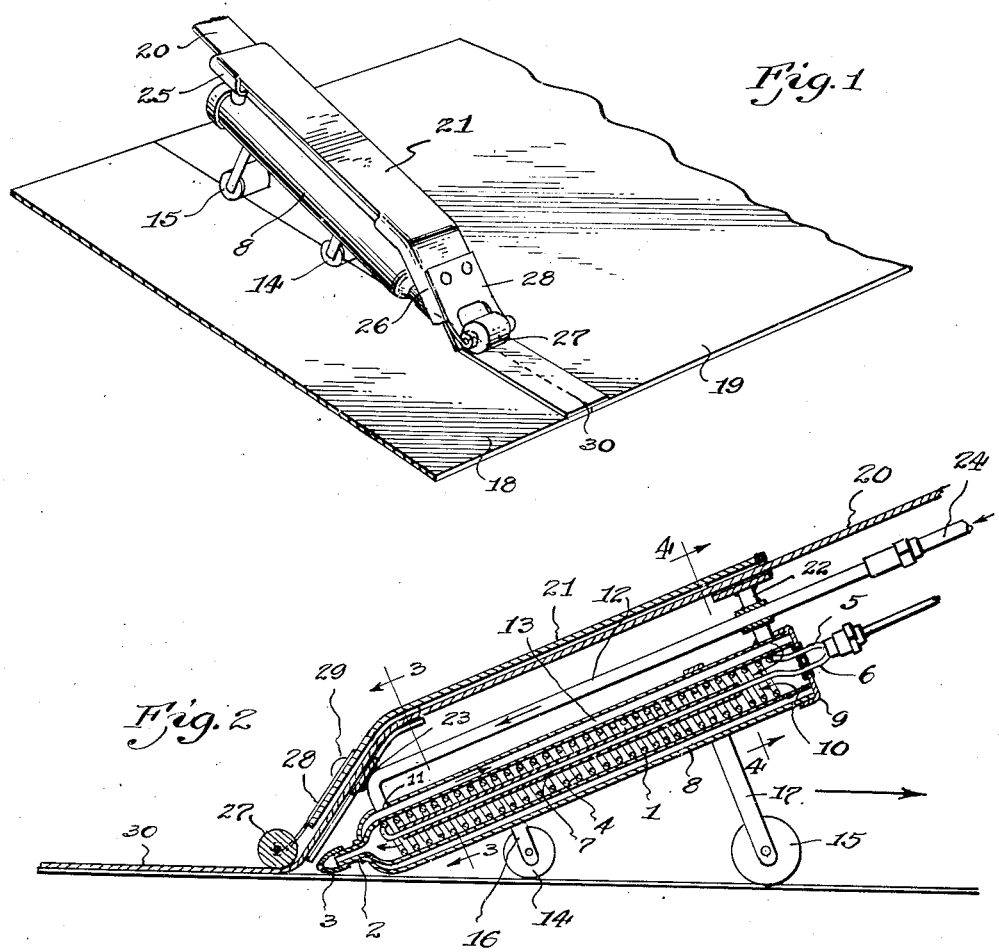
INVENTOR.
William M. Phillips, Jr.
BY Barnes, Kisselle, Laughlin & Raisch
Attorneys.

Patented Apr. 3, 1945

2,372,737

UNITED STATES PATENT OFFICE 2,372,737

TORCH FOR WELDING THERMOPLASTIC MATERIAL

William M. Phillips, Jr., Detroit, Mich., assignor to The Udylite Corporation, Detroit, Mich., a corporation of Delaware Application April 16, 1943, Serial No. 483,365

2 Claims. (Cl. 154—42)

This invention relates to a torch useful in the welding of thermoplastic materials according to the method described in the copending application of Gunnar Lindh and William M. Phillips, Jr., Serial No. 476,228, filed February 17, 1943, now Patent No. 2,367,725, dated January 23, 1945.

It is the object of this invention to produce a simple tool which materially facilitates and expedites the welding of thermoplastic materials.

Fig. 1 is a perspective view showing the tool in operative position during the welding operation.

Fig. 2 is a longitudinal sectional view through the tool.

Figs. 3 and 4 are sections along the lines 3—3 and 4—4 of Fig. 2.

The tool includes a torch for generating and directing a heated gaseous blast or jet against the surfaces to be welded to bring them to their welding temperature. For purposes of description and not by way of limitation, the torch is shown as comprising a tube 1 preferably of refractory material, one end of which is constricted as at 2 and has affixed thereto the nozzle 3. A resistance heating element 4, such as a coil of nickel-chrome (Nichrome) wire, is mounted within the tube 1.

The heating element 4 is provided with leads 5 and 6 through which the current is conducted to and from the heating element. Lead 6 is positioned within the coil 4 and is encased in a tube 7 of refractory material which prevents the lead from short-circuiting the coil. The refractory tube 1 is housed in a steel shell 8 provided with a closure 9 at one end through which leads 5 and 6 pass. The other end of shell 8 is closed down in air-tight relation with end 2 of refractory tube 1.

Tube 1 is provided with a plurality of circumferentially spaced orifices 10 adjacent one end and the opposite end of casing 8 is provided with a gas inlet 11 connected by means of conduit 12 with a source of gas (not shown) under pressure. The gas flowing through line 12 is preferably air or one of its component gases, or can be any other suitable gas which is inert when heated with respect to the thermoplastic material being welded. The gas, such as air under pressure, flows through line 12, enters the passageway 13 between tubes 1 and 8, and flows in the direction of the arrow on the outside of tube 1. The air then passes through orifices 10 and reverses its direction of flow through tube 1 and about the heating element 4 where it is heated to the desired temperature preparatory to being discharged from nozzle 3 against the surfaces to be welded to bring them to their welding temperature.

The tool is mounted upon a pair of spaced rollers 14 and 15 by means of brackets 16 and 17. These rollers rest upon the upper surfaces of sheets 18 and 19 to be welded and serve as a guide for locating the nozzle in position with respect to the sheets to be welded so that the hot gas blast will be properly directed.

For welding thermoplastic sheets 18 and 19 together there is provided a weld strip 20 of similar thermoplastic material. The tube is provided with a guide 21 through which the strip 20 is fed during the welding operation. The guide 21 is affixed at its rear end to the casing 8 by the bracket 22 and at its forward end is welded to the metal conduit 12 as at 23. Bracket 22 also serves as a support for the metal tube 12. Tube 12 is connected by means of a flexible conduit 24 with a source of air under pressure. The guide 21 is provided with channel portions 25 and 26 adjacent its rear and front ends through which the strip 20 is threaded and guided as it is fed down on the surfaces to be welded. A pressure roller 27 is rotatably mounted upon one end of a spring arm 28, the other end 29 of which is affixed to the guide 21. Strip 20 feeds under roller 27 which bears down upon strip 20 with sufficient spring pressure to press it into welding contact with the adjoining surfaces of sheets 18 and 19.

In operation the electrical current flowing through resistance element 4 brings the same to the desired temperature. The heating element 4 heats the air flowing through tube 1 in a counter-current direction to that flowing through tube 8 without tube 1. This hot air blast is directed from nozzle 3 against the upper surfaces of thermoplastic sheets 18 and 19 and the under surface of strip 20 to melt these surfaces or bring them to welding consistency. After the sheets 18 and 19 are placed edge to edge in abutting relation, the leading edge 30 of strip 20 is welded to sheets 18 and 19 and the tool then backed away gradually as the under surface of strip 20 and the upper adjacent surfaces of sheets 18 and 19 reach their welding temperature and consistency. The roller 27 applies welding pressure upon strip 30 and the adjacent surfaces of sheets 18 and 19. Roller 14 helps to hold the sheets down flat so that the heat from the nozzle 3 will be equally applied or distributed. Rollers 14 and 15 cooperate to enable the operator to hold the torch at a constant and proper angle with respect to the surfaces being welded. Rollers 14 and 15, of course, roll along on the upper surfaces of sheets 18 and 19.

This tool or torch is useful for welding thermoplastic materials, and in particular for welding of the vinyl resins or thermoplastic polymerized vinyl compounds, such as "Saran B-115," a trade name for a copolymer of vinylidene chloride and vinyl chloride, "Koroseal," a trade name for polymerized vinyl chloride plasticized with any of numerous well known organic plasticizers such as tricresyl phosphate or dioctyl phthalate, "Saran F-125," a trade name for a copolymer of vinylidene chloride and vinyl cyanide, "Vinylite," a trade name for a copolymer of vinyl chloride and vinyl acetate, polystyrene (polymerized styrene), polymers of vinyl benzene, polymers of vinyl chloride, polymers of vinyl acetate.

The temperature of the gas blast can be regulated by regulating the speed or amount of flow of the gas or air by the heating element 4 and also by regulating the amount of current flowing through the heating element.

From the above it is evident that the above tool will considerably expedite the welding together of thermoplastic sheets and facilitate the obtaining of a uniform weld throughout the area or length of material being welded.

I claim:

1. A welding tool useful in welding two sheets of thermoplastic material together when said sheets are placed edge to edge, comprising a torch having a nozzle adapted to direct a hot gaseous blast against the surfaces of the sheets adjacent said joint as the torch is moved along said joint, and guide means associated with said torch and terminating adjacent said nozzle for guiding a weld strip into said gaseous blast and over said joint to weld the two sheets and strip of thermoplastic material together as they reach their welding temperature, and pressure means positioned over said weld strip for pressing the same into welding relation with the said sheets over said joint while the surfaces of said strip and sheets are at welding temperature.

2. A welding tool useful in welding two sheets of thermoplastic material together when said sheets are placed edge to edge, comprising a torch having a nozzle adapted to direct a hot gaseous blast against the surfaces of the sheets adjacent said joint as the torch is moved along said joint, and guide means associated with said torch and terminating adjacent said nozzle for guiding a weld strip into said gaseous blast and over said joint to weld the two sheets and strip of thermoplastic material together as they reach their welding temperature, pressure means positioned over said weld strip for pressing the same into welding relation with the said sheets over said joint while the surfaces of said strip and sheets are at welding temperature, a roller support for the said torch, said roller support being adapted to support the torch inclined with respect to the surfaces so as to direct the hot blast against said surfaces to be welded and apply rolling pressure to the surfaces on both sides of the joint to hold the same flat and in juxtaposition during welding.

WILLIAM M. PHILLIPS, Jr.